US011269411B1

(12) United States Patent
Schritter et al.

(10) Patent No.: US 11,269,411 B1
(45) Date of Patent: Mar. 8, 2022

(54) GAZE DEPENDENT OCULAR MODE CONTROLLER FOR MIXED REALITY

(71) Applicant: A9.com, Inc., Palo Alto, CA (US)

(72) Inventors: Richard Schritter, Livermore, CA (US); Zachary Waibel, Menlo Park, CA (US); Daniel Lee Hamel, Clackamas, OR (US); Eric William Borts, Boulder Creek, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 17/118,106

(22) Filed: Dec. 10, 2020

(51) Int. Cl.
*G06F 3/01* (2006.01)
*G09G 5/14* (2006.01)
*G02B 27/01* (2006.01)

(52) U.S. Cl.
CPC ......... *G06F 3/013* (2013.01); *G02B 27/0172* (2013.01); *G09G 5/14* (2013.01); *G02B 2027/014* (2013.01); *G02B 2027/0136* (2013.01); *G09G 2340/12* (2013.01); *G09G 2354/00* (2013.01)

(58) Field of Classification Search
CPC ............... G06F 3/013; G02B 27/0172; G02B 2027/0136; G02B 2027/014; G09G 5/14; G09G 2340/12; G09G 2354/00
See application file for complete search history.

(56) References Cited

U.S. PATENT DOCUMENTS

| 2013/0241805 A1* | 9/2013 | Gomez | G06F 3/013 345/8 |
| 2013/0293580 A1* | 11/2013 | Spivack | G06Q 30/0623 345/633 |
| 2016/0284129 A1* | 9/2016 | Nishizawa | G06F 3/013 |
| 2019/0086669 A1* | 3/2019 | Percival | H01L 27/156 |

* cited by examiner

*Primary Examiner* — Brent D Castiaux
(74) *Attorney, Agent, or Firm* — Patterson + Sheridan, LLP

(57) ABSTRACT

Techniques for improving the visualization of content with a mixed reality (MR) device are described. One techniques includes monitoring a gaze of a user of a MR device through one or more displays of the MR device. A convergence distance of the gaze of the user is determined based on the monitoring. A selection between a first projection mode and a second projection to display content on the one or more displays is made based on whether the convergence distance exceeds a threshold distance from the user. Content is displayed on the one or more displays, based on the selection.

20 Claims, 9 Drawing Sheets

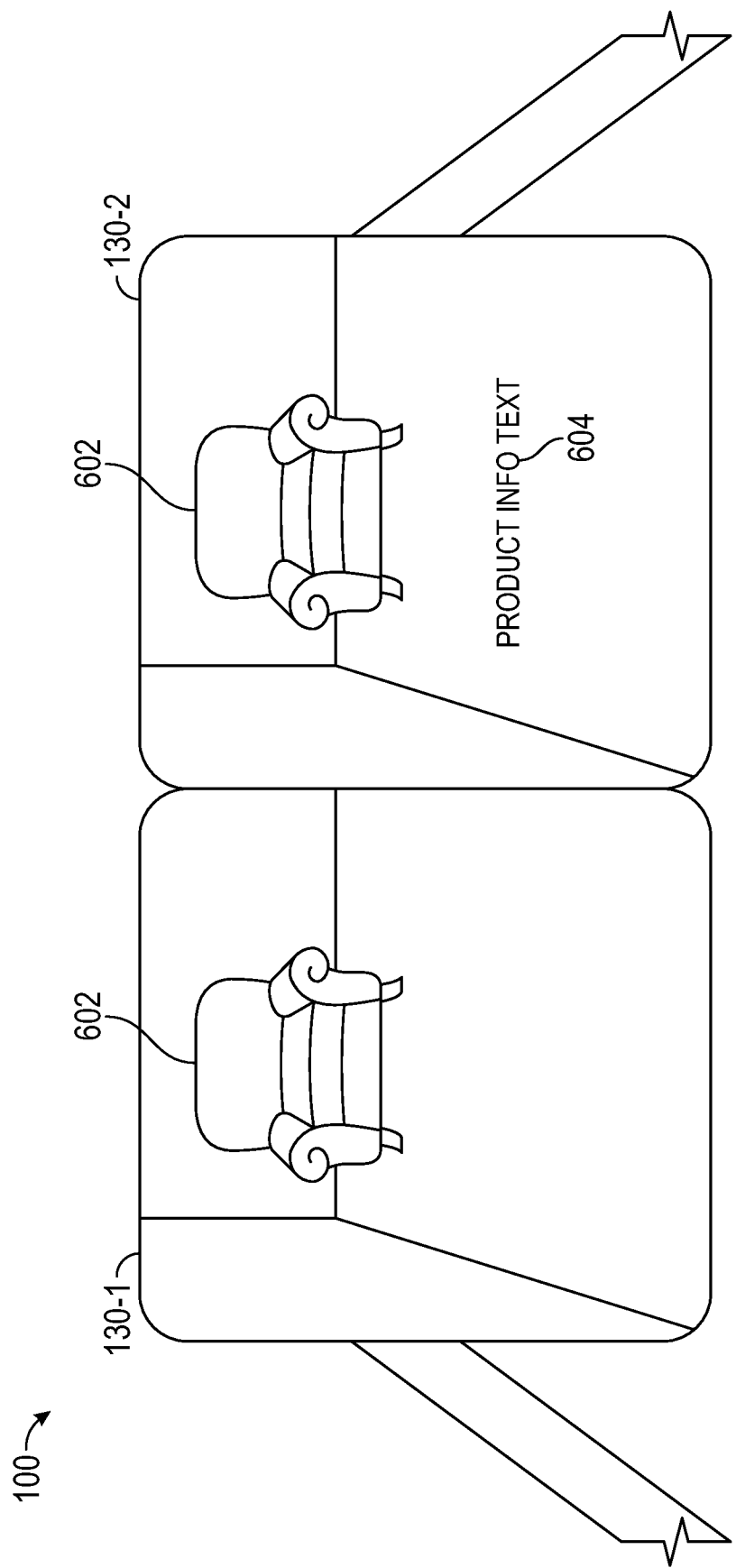

GAZE DEPENDENT OCULAR MODE CONTROLLER FOR MIXED REALITY

BACKGROUND

The present invention generally relates to mixed reality (MR)-capable devices, and more specifically, to techniques for improving visualization of content using a MR-capable device.

MR generally refers to the merging of a real-world environment and a virtual-world environment to produce new environments and visualizations for a user. MR can include anything on the continuum between the physical world and the virtual world. For example, MR can include augmented reality (AR), which involves superimposing computer generated imagery on a user's view of the real-world environment. AR can be used to provide operational information, gameplay experience, information overlays, etc., for shopping, navigational purposes, games, educational purposes, and the like. MR can also include virtual reality (VR), which involves isolating a user from their real-world environment by replacing the natural field-of-view of the real-world environment with virtual imagery.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

FIGS. 6A-6C illustrate an example scenario of visualizing a physical environment with a MR-capable device, according to one embodiment.

DETAILED DESCRIPTION

A MR-capable device (e.g., MR-capable smart glasses, MR-capable headset, etc.) may support a mixed reality experience, in which the device displays visual content overlaying a view of the physical environment. In one example, the visual content can include graphics for a game application. In another example, the visual content can include information content for a virtual object inserted into a video feed or a field of view of the physical environment. In yet another example, the visual content can include information content for a physical object in the real-world environment visible to a user.

One issue with current MR-capable devices is that they are generally susceptible to parallax effects caused by viewing an object from two different positions. For example, in cases of natural vision (e.g., without the use of a MR-capable device), from a user's perspective, near-field objects can shift and/or blur, as the user's focus shifts to far-field (or distant) objects. Similarly, from a user's perspective, far-field objects can shift and/or blur as the user's focus shifts to near-field objects.

These parallax phenomena can be reproduced in current MR-capable devices, causing distractions to the user and impacting the user experience. For example, when a user wearing a binocular MR-capable device focuses on a distant object in MR, near field objects that are presented in the user's field-of-view (FOV) may suffer from parallax effects (e.g., the near-field objects may appear doubled and blurred, relative to the appearance of the distant object). For large sized near-field objects, the parallax effect can become significantly disorienting and distracting to the user, due to the extensive coverage of the user's FOV, for example.

Figure 1A:
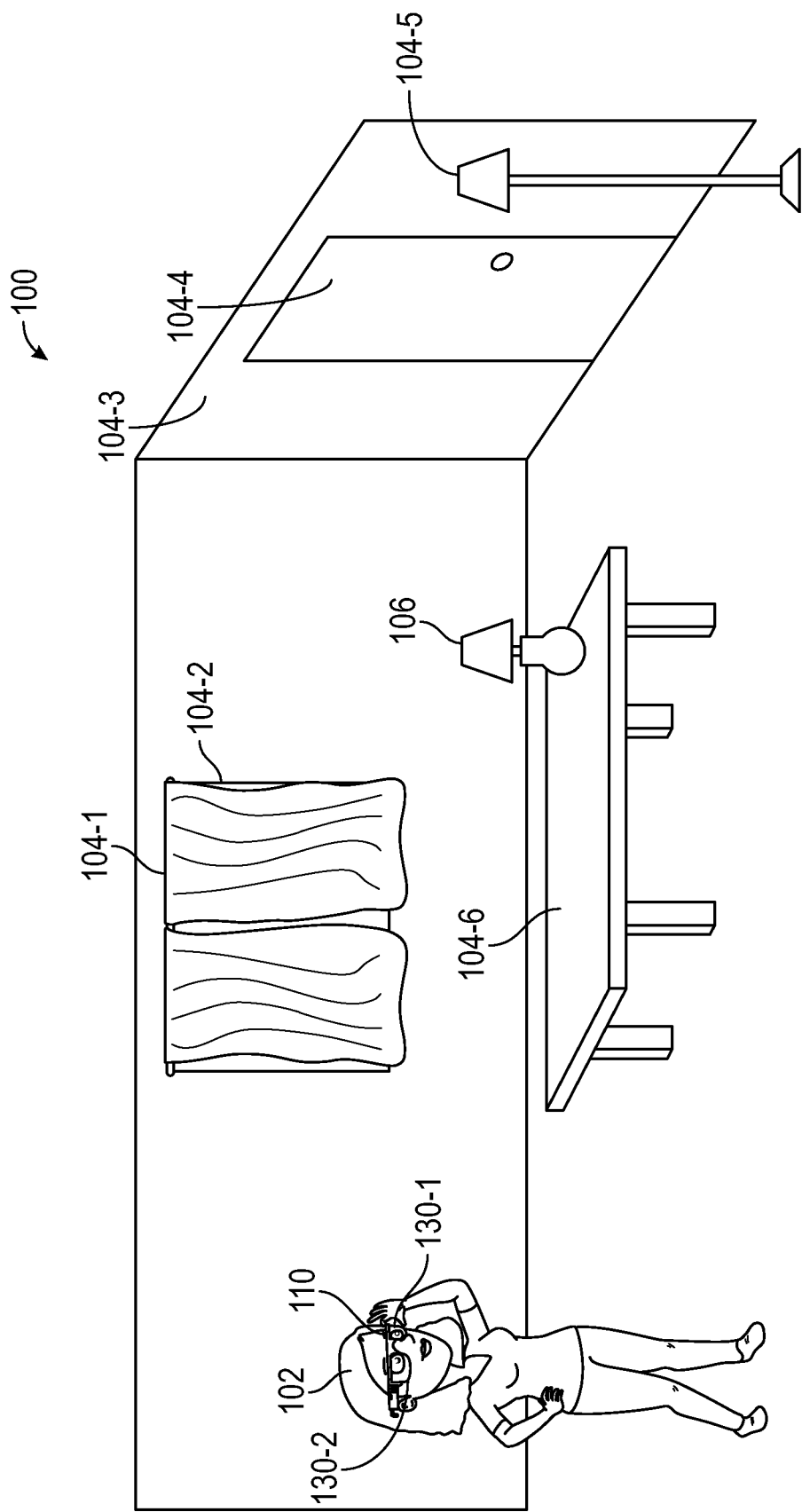
FIG. 1A illustrates an example scenario of interacting with a physical environment using a MR-capable device.
Figure 1B:
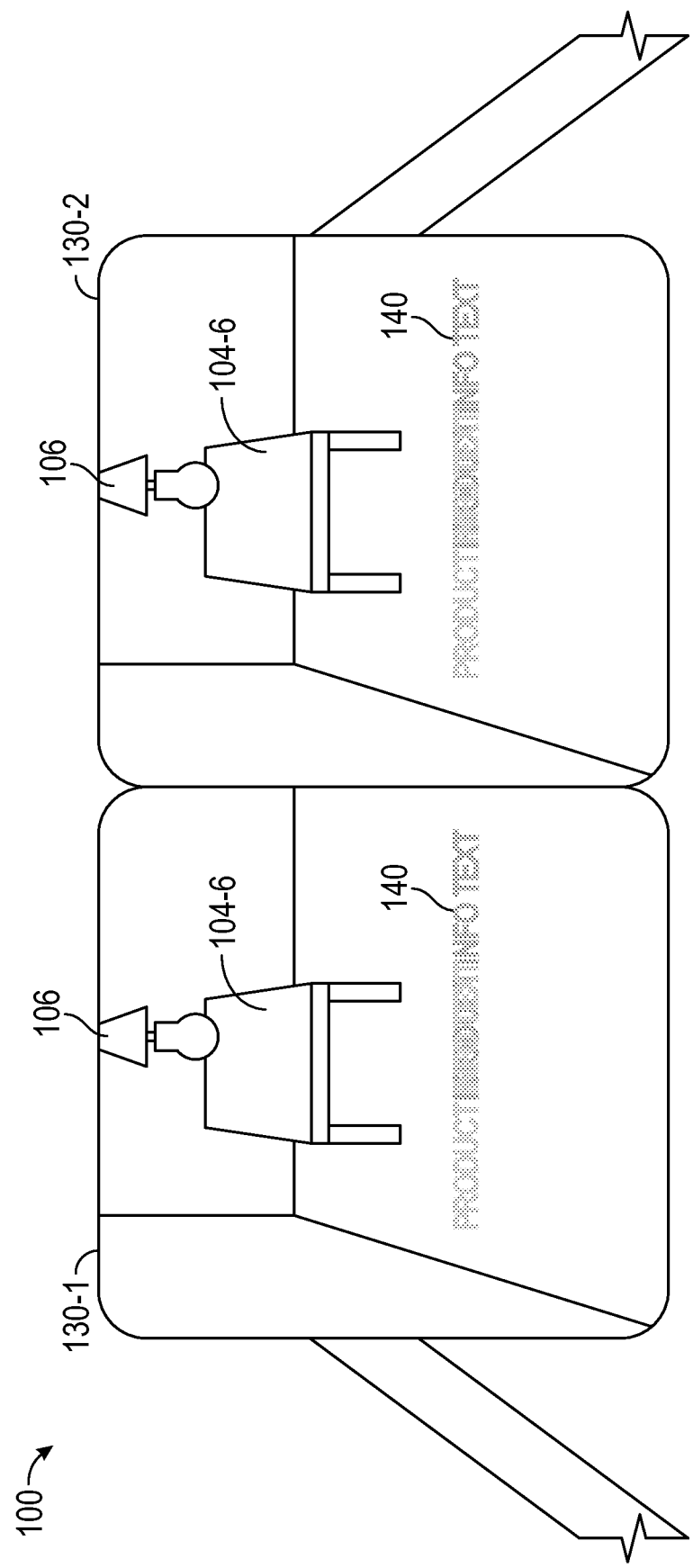
FIG. 1B illustrates an example field-of-view of a physical environment with a MR-capable device.

FIGS. 1A-1B illustrate an example scenario in which parallax effects can cause a negative (or poor) user experience in current MR-capable devices (also referred to as MR devices). Here, a user 102 may wear the MR-capable device 110 (shown as smart glasses in this example) to interact with the physical environment 100. The physical environment 100 includes multiple physical (or real-world) objects 104, including, for example, physical object 104-1 (e.g., curtains), physical object 104-2 (e.g., window), physical object 104-3 (e.g., walls), physical object 104-4 (e.g., door), physical object 104-5 (e.g., floor lamp), and physical object 104-6 (e.g., table), etc. Note that while FIG. 1A depicts the physical environment 100 as an indoor environment, the physical environment 100 can be an outdoor environment.

The user 102 can participate in an MR session within the physical environment 100 via the MR-capable device 110. As shown in FIGS. 1A and 1B, the MR-capable device 110 can display (or render or present) the virtual object 106 (e.g., lamp) within the user's FOV of the physical environment 100, e.g., to allow the user to visualize what the virtual object 106 would look like in the physical environment 100 (e.g., from different angles, viewpoints, etc.). The user 102 may have selected (or requested) to view the virtual object 106, while browsing for items in a retail software application, for example. In this particular example, the virtual object 106 is presented as appearing on top of the physical object 104-6 (e.g., table). As described herein, virtual objects are displayed by the MR-capable device 110 while the physical objects are simply seen by the user of the MR-capable device 110.

In some cases, while interacting with the virtual object 106, the MR-capable device 110 can present information (or other virtual objects) associated with the virtual object 106 in the user's FOV. Assuming the user is interacting with a retail software application, for example, this information can include product information (e.g., text content and/or graphical content) associated with an item (e.g., product-for-sale) corresponding to the virtual object 106. Examples of the product information can include price, ratings, reviews, technical description, availability information, etc. Note, however, that this is merely an example, and that the information associated with the virtual object 106 may be different in other contexts. As shown in FIG. 1B, which depicts a FOV of the physical environment 100 with the MR-capable device 110, the product information text 140 (also referred to as product info text) is presented in the binocular display (also referred to as a stereoscopic display) (e.g., display 130-1 and the display 130-2) of the MR-capable device 110. In this example, however, because the user is focused on a far-field object (e.g., virtual object 106)

within the physical environment 100, the product information text 140 appears doubled and blurry, due to parallax effects.

Embodiments described herein provide systems and techniques that enable improved visualization of content on a MR-capable device. More specifically, embodiments provide techniques for selecting between projection modes on a MR-capable device to display content, based on the gaze of a user wearing the MR-capable device. As described in more detail below, the MR-capable device may be equipped with gaze tracking technology (also referred to as eye tracking technology) (e.g., hardware and/or software components) that can track the position of each eye of the user in order to determine a focus point of the user's gaze (e.g., where the user is looking). The MR-capable device described herein can use gaze tracking technology to monitor the position of each eye of the user and determine the distance (from the user) to a convergence point (also referred to as gaze point or eye convergence) of the user's eyes. The MR-capable device may display content (e.g., visual content, such as product information text) using a monocular projection mode when the convergence distance is at a distance(s) greater than a predefined distance from the user. The MR-capable device may display the content using a binocular projection mode when the convergence distance is at a distance(s) less than or equal to the predefined distance from the user. By switching between different projection modes based on a depth of a user's gaze, embodiments can significantly reduce the parallax effects that can occur when visualizing content with a binocular MR-capable device.

Note that certain embodiments are described herein using a retail software application for various household items (e.g., furniture) as an example of computer software that supports visualizations of items with a MR-capable device. In other embodiments, the techniques presented herein may be used for visualization of a wide variety of items (e.g., clothing, groceries, books, electronics, etc.).

As used herein, a physical object (or item or product) is generally an object that has a physical, tangible existence. A physical object may also be referred to as a real-world object (or item or product). As used herein, a virtual object is generally a digital or virtual representation (of a real-world or non-real-world object) that is generated and/or displayed by the MR-capable device. For example, a virtual object can include a physical object (e.g., person, chair, etc.) that has been sampled by a device (e.g., camera) and re-presented to the user (e.g., on a display) via the MR-capable device. A virtual object (or item or product) may also be referred to as an AR object, a virtual representation (of a physical object), a three-dimensional (3D) model (of a physical object), etc.

Figure 2:
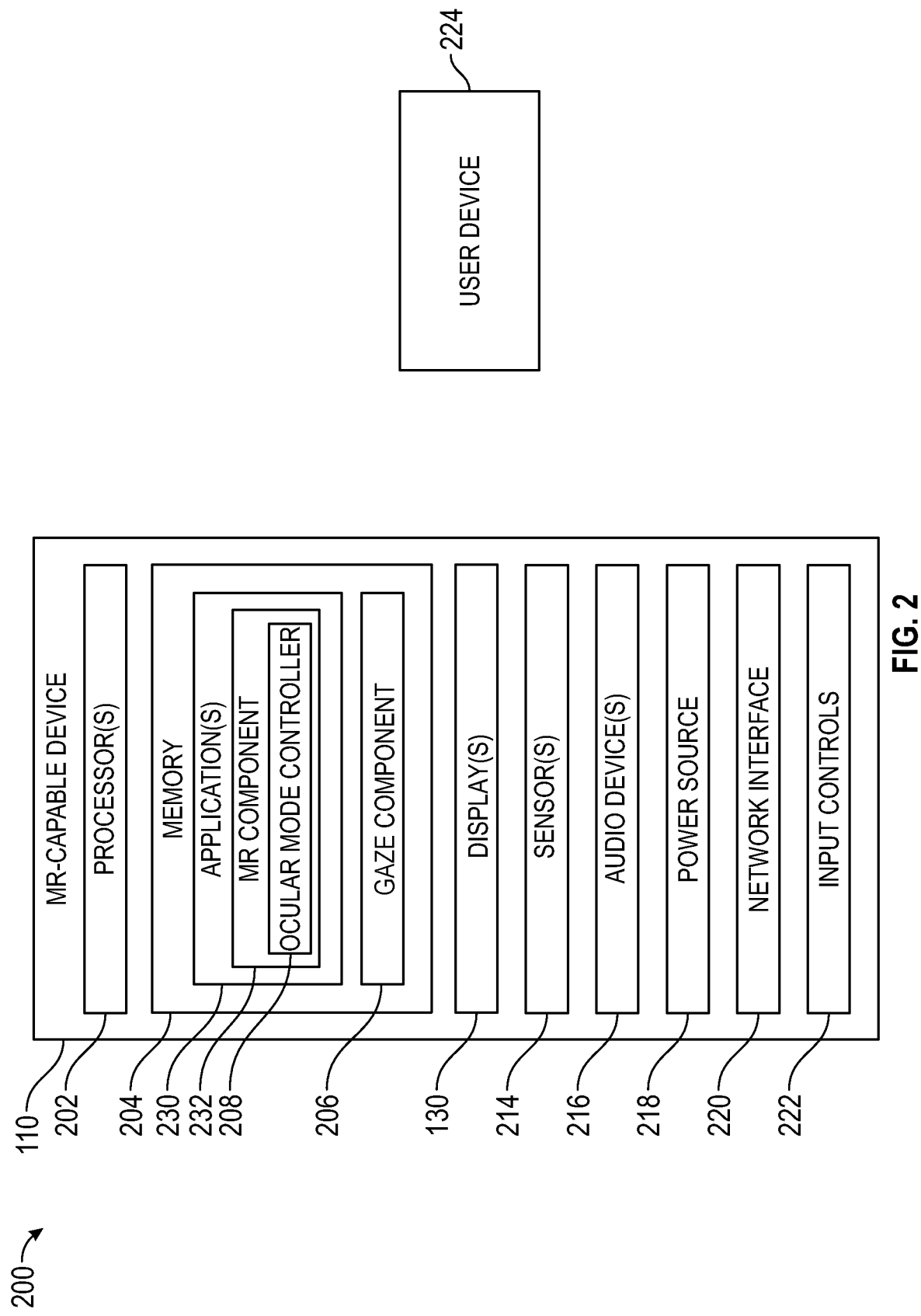
FIG. 2 illustrates a block diagram of a MR system, according to one embodiment.

FIG. 2 illustrates a block diagram of a MR system 200, according to one embodiment. As shown, the MR system 200 includes a MR-capable device 110, which is configured to provide MR functionality for a user in a physical environment (e.g., physical environment 100). For example, the MR-capable device 110 may provide AR and/or VR display functionality for the user. The MR-capable device 110 may be embodied in any suitable form. In some embodiments, the MR-capable device 110 is a body-worn computing device, e.g., integrated into an assembly worn on the head of a user. Examples of such body-worn computing devices can include, but are not limited to, a head mounted display (HMD), a wearable heads-up display (HUD), a headset, smart glasses, a visor, a helmet, etc.

As shown, the MR-capable device 110 includes one or more processors 202, a memory 204, one or more displays 130, one or more sensors 214, one or more audio devices 216, a power source 218, a network interface 220, and one or more input controls 222. The processor(s) 202 generally retrieve and execute programming instructions stored in the memory 204. Processor(s) 202 is representative of a single central processing unit (CPU), multiple CPUs, a single CPU having multiple processing cores, and/or graphics processing units (GPUs) having multiple execution paths, and the like. The memory 204 is generally included to be representative of a random access memory, but may further include non-volatile storage of any suitable type(s).

Memory 204 generally include program code for performing various functions related to providing MR functionality (including AR and/or VR functionality) for a user (e.g., user 102) of the MR-capable device 110. The program code is generally described as various functional "applications" or "modules" within the memory 204, although alternate implementations may have different functions or combinations of functions. Here, the memory 204 includes application(s) 230, which includes an MR component 232 generally configured to provide MR functionality for the user (e.g., by presenting visual content in the user's FOV of the environment). The memory 204 also includes a gaze component 206 (also referred to as an eye tracking component). Note, however, that FIG. 2 depicts a reference example of the components of the memory 204. For example, the MR component 232 and the gaze component 206 can include software, hardware, or combinations thereof. The MR component 232 and the gaze component 206 are described in more detail below.

The display(s) 130 (also referred to as display devices) may include visual displays of any suitable type. For example, the display(s) 130 can each include any type of dynamic display capable of displaying a visual interface to a user, and each of the display(s) 130 may include any type of light emitting diode (LED), organic LED (OLED), cathode ray tube (CRT), liquid crystal display (LCD), LCD with transparent backlight, plasma, electroluminescence (EL), or other display technology, as well as an arrangement of optical elements that cooperate to provide an image to a user. In one embodiment, the MR-capable device 110 includes a single display 130 with multiple display areas. For example, the single display 130 can include a first display area positioned for viewing by a first eye of the user and can include a second display area positioned for viewing by a second eye of the user. In another embodiment, the MR-capable device 110 includes two displays 130. In this embodiment, one of the two displays 130 (e.g., a first display 130) may include a first display area positioned for viewing by a first eye of the user and the other of the two displays 130 (e.g., a second display 130) may include a second display area positioned for viewing by a second eye of the user.

The optical arrangements in the display(s) 130 may be configured to transmit some or all of the light emitted by an LED, OLED, LCD, plasma, EL, or other display to the user's eyes. The optical arrangement may be further configured to transmit some or all of the light from the physical environment to the user's eyes. In some embodiments, the MR-capable device 110 provides a binocular (or stereoscopic) display consisting of two displays 130. For example, in this embodiment, a different display 130 is provided for each eye of a user, such that the user is presented with three-dimensional (3D) virtual objects in the FOV. In another embodiment, the binocular display may be implemented with a single display 130 having multiple displays areas, e.g., a different display area provided for each eye of a user, such that the user is presented with 3D virtual objects in the FOV. As noted, in one embodiment, each display 130 is transparent such that physical objects are visible through the display 130. For example, each display 130 can be configured as an eyepiece or lens worn in front of the respective eye. In such an embodiment, one or more virtual objects may be overlaid with the physical objects and displayed on the display 130 for each eye of the user.

The sensors 214 (also referred to as sensor devices) may include various devices configured to sense information from the environment. Some non-limiting example sensors 214 include visual sensors, acceleration sensors, gyroscope, eye tracking sensors, Global Positioning System (GPS) receivers, inertial motion units (IMUs), etc. The visual sensors may include camera(s) configured to sense visible light and/or infrared light. In some embodiments (e.g., when operating in AR mode), one or more cameras may be activated in the MR-capable device 110 to provide a video feed over which virtual objects may be overlaid or into which virtual objects may be programmatically inserted. Note, however, that the camera(s) may be omitted or deactivated in embodiments that use an external device to provide a video feed or a transparent surface that a user may view the environment through.

The acceleration sensors generally measure acceleration forces acting on the MR-capable device 110, and may provide the MR-capable device 110 with information regarding whether the user wearing the MR-capable device 110 is moving, and in which direction(s). The gyroscope can measure orientation of the MR-capable device 110, and provide information as to whether the MR-capable device 110 is level or to what the degree the MR-capable device 110 is titled. In some embodiments, the combination of the accelerometer and gyroscope may provide information of a direction sense for the MR-capable device 110 in terms of pitch and roll with respect to gravity.

In some embodiments, the sensor(s) 214 include an eye tracking sensor(s) that monitors (or track) the gaze of the user. For example, when the MR-capable device 110 is worn by a user (e.g., on the user's head), an eye-tracking sensor(s) may be placed in such a manner that it faces the user's eyes. The eye tracking sensor(s) can be used to track each user's eye in order to determine the point of gaze (e.g., where the user is looking). The eye tracking sensor(s) can be implemented using visual sensors (e.g., cameras), projectors (e.g., near infrared (NIR) projectors), etc.

The audio devices 216 may include audio input/output devices. The audio devices 216 may include conventional audio microphones and speakers having any suitable form factor (e.g., standalone, integrated in a stereo, headphones, etc.), as well as devices using alternative methods of producing and receiving sound perceptible by a user, such as bone conduction transducers in the MR-capable device 110. In some embodiments, the audio devices 216 are included within the user device 224.

The power source 218 provides electric power to the various components of the MR-capable device 110. Various examples of power sources 218 include batteries (rechargeable and non-rechargeable), Alternating Current to Direct Current (AC/DC) converters, Direct Current to Alternating Current (DC/AC) converters, transformers, capacitors, inductors, and wiring to connect to an external power source.

The network interface 220 provides wireless communications for the MR-capable device 110. In various embodiments, the network interface 220 includes a transmitter and/or receiver to communicate with an external device(s). In general, the network interface 220 may be any type of network communications interface that allows the MR-capable device 110 to communicate with other computers and/or components.

The input control(s) 222 can receive input from a user to control the MR experience via the MR-capable device 110. Note although shown as part of the MR-capable device 110, in some embodiments, the input control(s) 222 may be separate from the MR-capable device 110. The input control(s) 222 may include physical joysticks, physical steering wheels/yokes, physical buttons, physical switches, microphones, a touch interface that designates various regions for use as virtual joysticks, buttons, switches, etc. A user may manipulate the various input control(s) 222 to signal the application 230 to alter the MR experience (e.g., display content, select content, remove content, etc.), shut down the MR-capable device 110, switch to a different application 230, change system settings (e.g., volume, brightness), etc.

In some embodiments, the MR system 200 includes a user device 224. In some embodiments, one or more of the processor(s) 202, memory modules (or components) of memory 204, input control(s) 222, sensor(s) 214, etc., may be separate from the MR-capable device 110 and integrated into the user device 224, while the display(s) 130 (and other components) are located on the MR-capable device 110. In these embodiments, the user device 224 may drive the display(s) 130 on the MR-capable device 110, e.g., by providing the content to present on the display(s) 130. The MR-capable device 110 can communicate with the user device 224 via a wired and/or wireless interface (or connection). The user device 224 is representative of various computing devices, including, for example, a smartphone, a tablet computer, a desktop computer, a server, etc. Although shown as a single device, in some embodiments, the user device 224 includes multiple devices that interact with the MR-capable device 110 to provide MR functionality for the user.

As noted above, the MR component 232 generally provides MR functionality for the user via the MR-capable device 110. In some embodiments, the MR component 232 can operate in an AR mode. In this AR mode, the MR component 232 can provide AR functionality for the user by superimposing (or inserting) virtual objects (or content) into the user's natural FOV of the environment using the MR-capable device 110. The virtual object(s) can be inserted into the user's FOV so that it appears as if the virtual object(s) is part of the physical environment. In other embodiments, the MR component 232 can operate in a VR mode. In this mode, the 1\4R component 232 can isolate the user from the physical environment by completely replacing the user's FOV of the physical environment with virtual imagery.

The gaze component 206 is generally configured to monitor the positions of each eye of the user to determine a (convergence) distance to a convergence point (or gaze point) where the user's eyes converge. As used herein, the convergence point may refer to the point (or position) where a ray (or line-of-sight (LOS)) cast from a (center) position of each eye of the user intersect each other. The ray can be based on the visual axis (e.g., the line connecting the center of the cornea and the fovea) or the optical axis (e.g., the line passing through the centers of pupil, cornea, and the eyeball).

Although shown as part of memory 204, the gaze component 206 can include software, hardware, or combinations thereof. For example, the gaze component 206 can include and/or interact with one or more sensors 214 (e.g., eye tracking sensor(s)). The gaze component 206 can implement a variety of gaze tracking techniques to determine the convergence distance of the user's gaze. Example gaze tracking techniques include, but are not limited to, model-based techniques (which use geometric model features of the eye to calculate the gaze direction (or 3D direction vector)), interpolation-based techniques (which employ regression-based methods to map image features of the eye to gaze coordinates), appearance-based techniques (which take the contents of an image of the eye as input with the objective of mapping them to a 3D point in space), visible light-based techniques (which can be used as a substitute for infrared (IR)-based techniques), etc.

As also shown, the MR component 232 includes an ocular mode controller 208, which is configured to perform one or more techniques described herein. The ocular mode controller 208 can include software, hardware, or combinations thereof. In one embodiment described herein, the ocular mode controller 208 is configured to select between projection modes of the MR-capable device 110, based on the gaze of the user (e.g., determined by the gaze component 206). For example, the ocular mode controller 208 can change the projection mode of the MR-capable device 110 to binocular mode, when the gaze of the user satisfies a predetermined condition (e.g., the convergence distance of the user's gaze exceeds a predetermined distance from the user). In binocular mode, the MR component 232 can display (or render or present or project) virtual objects (or content) on (i) both displays 130 of the MR-capable device 110 (e.g., assuming the MR-capable device 110 is equipped with two displays 130) or (ii) both display areas of a single display 130 of the MR-capable device 110 (e.g., assuming the MR-capable device 110 is equipped with a single display 130).

Additionally, the ocular mode controller 208 can change the projection mode of the MR-capable device 110 to monocular mode, when the gaze of the user does not satisfy the predetermined condition (e.g., the convergence distance of the user's gaze is less than or equal to the predetermined distance from the user). In monocular mode, the MR component 232 can display virtual objects (or content) on (i) a single display 130 (as opposed to both displays 130) of the MR-capable device 110 (e.g., assuming the MR-capable device 110 is equipped with two displays 130) or (ii) a single display area (as opposed to both display areas) of a single display 130 of the MR-capable device 110 (e.g., assuming the MR-capable device 110 is equipped with a single display 130). In some embodiments, the ocular mode controller 208 can continually monitor the convergence distance of the user's gaze and switch the projection mode for displaying content based on the current convergence distance of the user's gaze. In this manner, the ocular mode controller 208 can significantly enhance user experience with MR features by reducing parallax effects associated with binocular MR-capable devices.

Note that FIG. 2 illustrates a reference example of a MR system 200 in which the techniques presented herein can be implemented and that the techniques presented herein can be implemented in other computing environments. For example, in some embodiments, the MR-capable device 110 is a standalone system that can operate without user device 224. In other embodiments, the MR-capable device 110 may be communicatively coupled to the user device 224 and may exchange information with the user device 224 to implement the techniques described herein.

Figure 3:
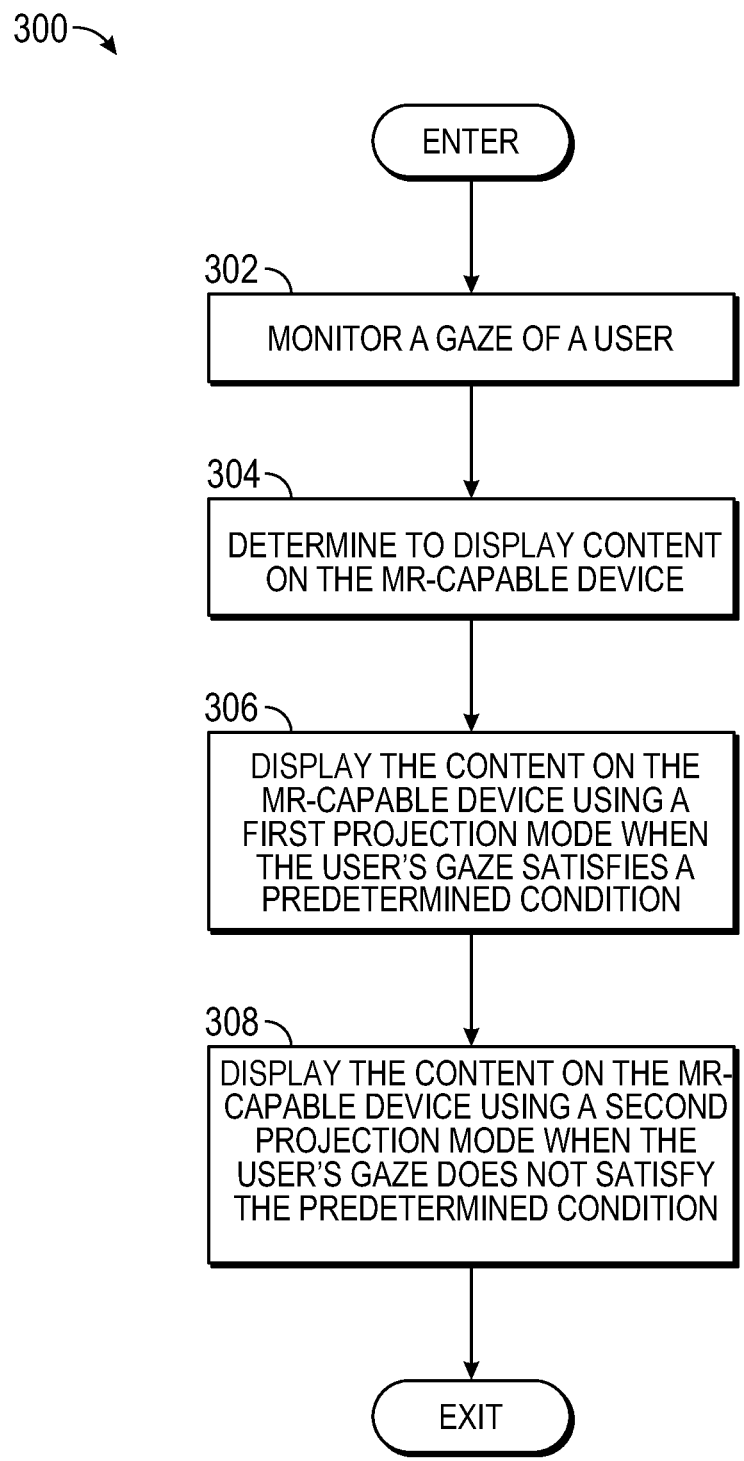
FIG. 3 is a flowchart of a method for controlling a projection mode of a MR-capable device, according to one embodiment.

FIG. 3 is a flowchart of a method 300 for controlling a projection mode of a MR-capable device, according to one embodiment. The method 300 may be performed by a MR component (e.g., MR component 232) and/or one or more components of a MR-capable device (e.g., MR-capable device 110).

Method 300 enters at block 302, where the MR component monitors a gaze of a user. For example, the MR component can monitor the gaze of the user, via a gaze component (e.g., gaze component 206) of the MR-capable device. In some embodiments, the MR component can obtain information from the gaze component indicating the convergence distance of the user's gaze (e.g., a depth of the user's focus). For instance, the information can indicate whether the user is focused on an object or a position that is located beyond a threshold distance from the user or is focused on an object or a position that is located within the threshold distance.

In some embodiments, the threshold distance is a pre-configured distance set by the user of the MR-capable device. In these embodiments, the threshold distance can be set according to user preference (e.g., the user may have a different tolerance for parallax effects compared to other users). In other embodiments, the threshold distance is a pre-configured distance set by the application (e.g., application 230) of the MR-capable device providing the MR experience for the user. In these embodiments, the threshold distance may be different depending on how the MR-capable device is being used (e.g., which application is currently executing on the MR-capable device).

At block 304, the MR component determines to display content on one or more displays (e.g., display(s) 130) of the MR-capable device. In one embodiment, the MR component may determine to present content for a virtual object presented on the display(s) of the MR-capable device. In this embodiment, the content can include one or more text content and/or graphics elements describing information associated with the virtual object. In another embodiment, the MR component may determine to present content for a physical object that can be seen through the display(s) of the MR-capable device. In this embodiment, the content can include one or more text content and/or graphics elements describing information associated with the physical object. In general, the content that the MR component determines to render in block 304 can include any virtual object(s).

At block 306, the MR component displays the content on the MR-capable device using a first projection mode (e.g., monocular mode) when the user's gaze satisfies a predetermined condition (e.g., the convergence distance of the user's gaze is greater than a threshold distance from the user). In one embodiment, the content (at block 306) is displayed at or within the threshold distance using the first projection mode. At block 308, the MR component displays the content on the MR-capable device using a second projection mode (e.g., binocular mode) when the user's gaze does not satisfy the predetermined condition (e.g., the convergence distance of the user's gaze is at or within the threshold distance from the user). In one embodiment, the content (at block 308) is displayed at or within the threshold distance using the second projection mode. In one embodiment, the MR component may perform blocks 306 and 308, while the MR component determines to display the content for the user using the MR-capable device. The method 300 may then exit.

Figure 4:
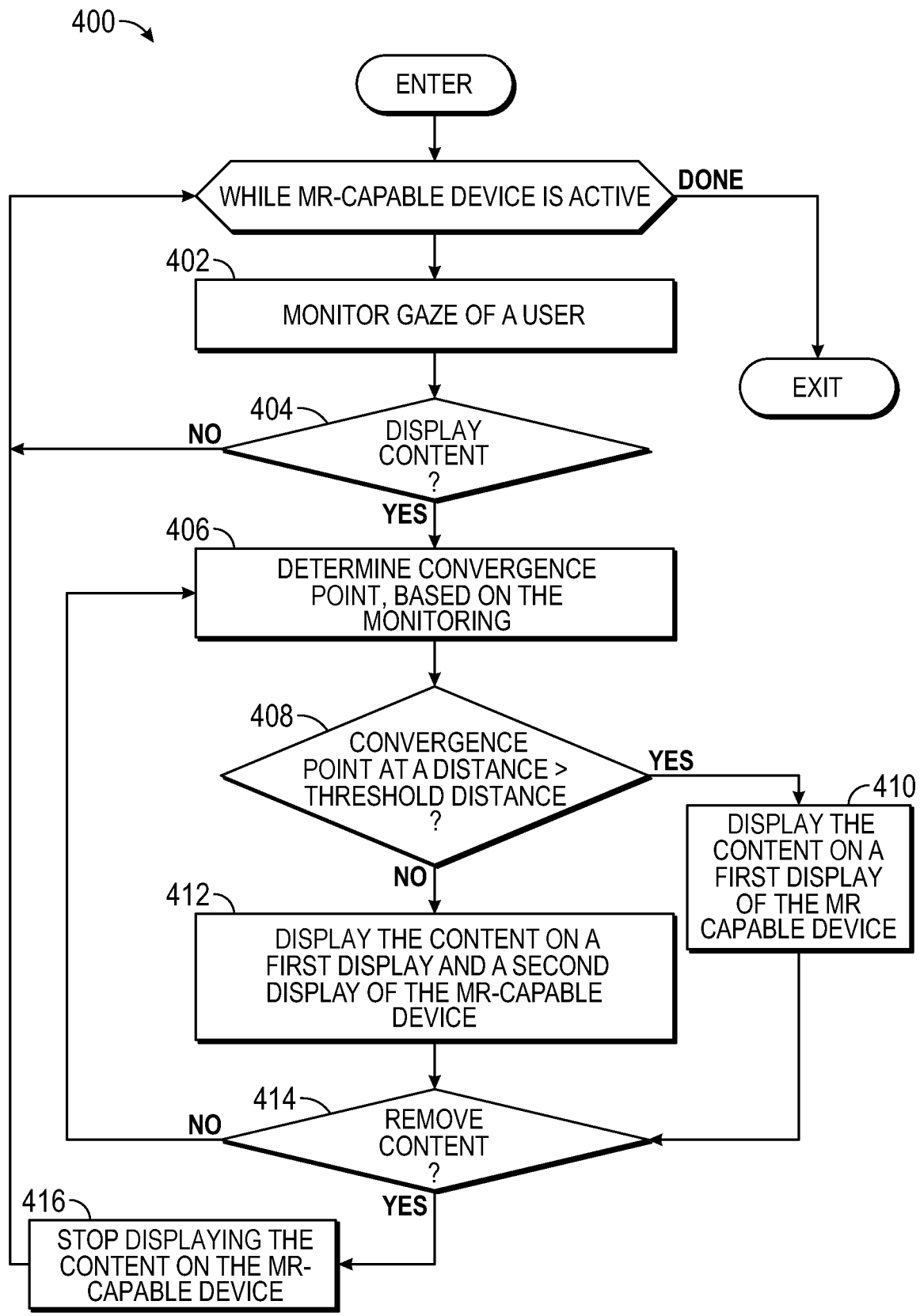
FIG. 4 is a flowchart of a method for displaying content using a MR-capable device, according to one embodiment.

FIG. 4 is a flowchart of a method 400 for displaying content using a MR-capable device, according to one embodiment. The method 400 may be performed by a MR component (e.g., MR component 232) and/or one or more components of a MR-capable device (e.g., MR-capable device 110). The method 400 may be performed while the MR-capable device is activated and/or executing an application (e.g., application(s) 230).

Method 400 enters at block 402, where the MR component monitors a gaze of a user (e.g., user 102) (e.g., using the gaze component 206, eye tracking sensors, etc.). At block 404, the MR component determines whether to display content for the user via the MR-capable device. In some cases, the MR component may receive an instruction to display content (e.g., from the application(s)).

For example, the application may determine to display content using the MR component based on the MR functionality supported by the application. In another example, the instruction to display content may be based on input(s) from a user. For example, the user may be interacting with a virtual object displayed on the display(s) (e.g., display(s) 130) and may select (e.g., via one of the input control(s) 222) to view additional information regarding the virtual object. In another example, the user may view a physical object through the displays of the MR-capable device and may generate (e.g., via one of the input control(s) 222) a query to view information regarding the physical object.

In some embodiments, the MR component may determine to display content for the user, upon detecting that one or more predetermined conditions are satisfied. In one particular embodiment, the predetermined condition(s) is based on the gaze of the user. Referring to an example scenario in FIG. 5, at step 510, the user is initially focused on an object 502 in the physical environment, where the object 502 is located a distance $D_1$ from the user. Note object 502 may be a virtual object displayed on the displays of the MR-capable device or a physical object viewable through the displays of the MR-capable device. In this example, when the MR component determines that the user's focus on the object 502 lasts for a predetermined amount of time (e.g., one second or some other amount of time), the MR component may determine to display content associated with the object 502 (e.g., the content may include additional information regarding the object 502).

Referring back to FIG. 4, if the MR component does not determine to display content (block 404), then the MR component may continue to monitor the gaze of the user (block 402) (e.g., assuming the MR device is active). On the other hand, if the MR component does determine to display content (block 404), then the MR component determines a convergence point of the user's gaze, based on the monitoring (block 406). For example, the MR component may determine the point (or position) where the LOS from each eye of the user intersects in the environment, e.g., based on information from the gaze component 206.

Figure 5:
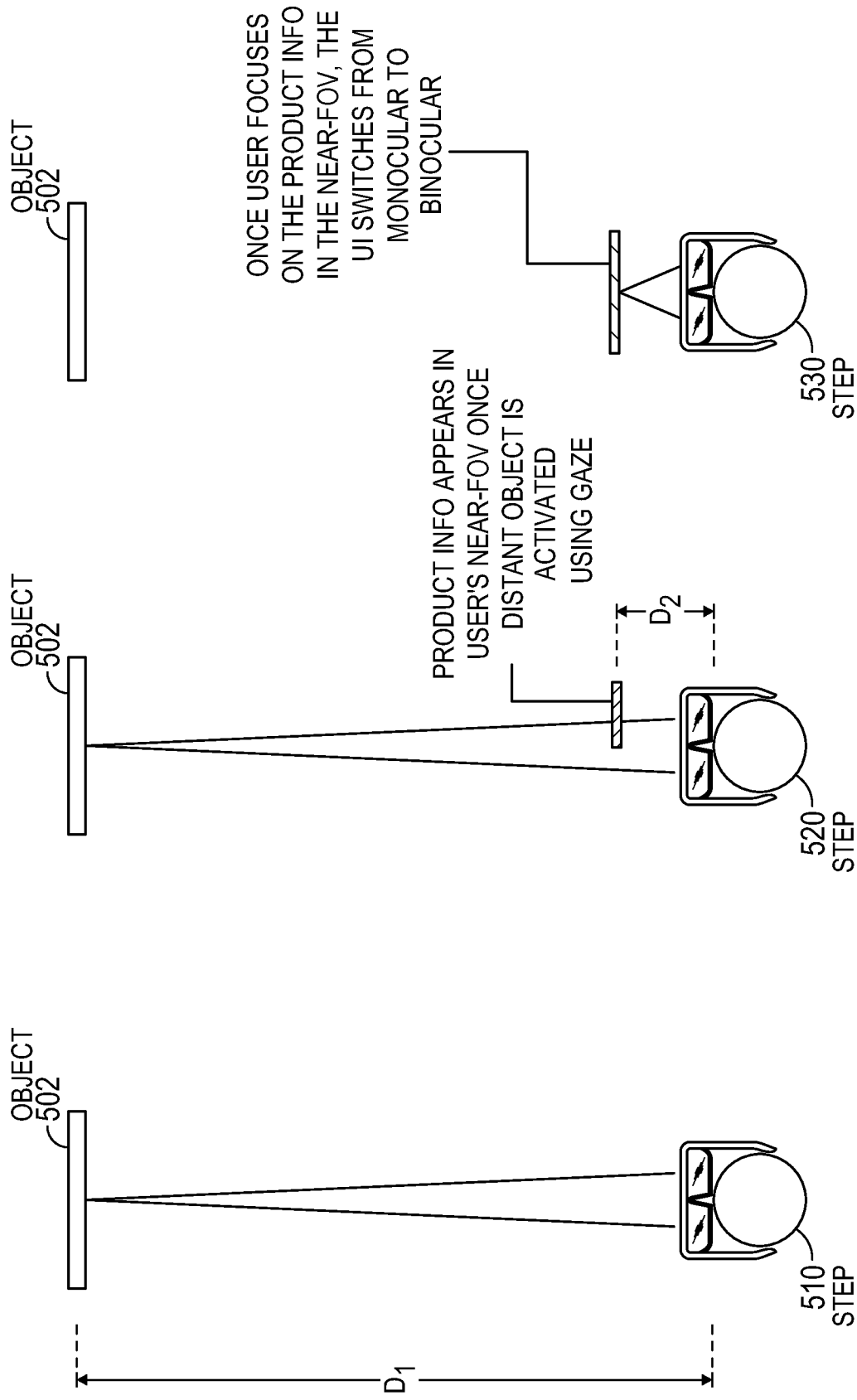
FIG. 5 illustrates an example scenario for displaying content using a MR-capable device, according to one embodiment.

At block 408, the MR component determines whether the convergence point is at a distance beyond a threshold distance from the user. If so, then the MR component displays the content on a first display (e.g., display 130-2) of the MR-capable device (as opposed to both displays 130-1 and 130-2 of the MR-capable device) (block 410). That is, the MR component may activate (or switch to or select) monocular mode in block 410. Referring again to the example scenario in FIG. 5, at step 520, the MR component displays the content in one of the displays when the user's gaze is still focused on the object 502, which is located a distance $D_1$ from the user, where $D_1$ exceeds the threshold distance Dz. As shown in FIG. 5, the MR component displays the content in the user's near FOV (e.g., at or within $D_2$) once the object 502 is activated (or triggered) based on the user's gaze. In embodiments where the MR-capable device includes a single display (as opposed to two displays), the MR component (at block 410) displays the content on a first display area of the single display (as opposed to both display areas of the single display).

If, at block 408, the MR component determines that the convergence point is not at a distance beyond the threshold distance from the user, then the MR component displays the content on a first display (e.g., display 130-2) and second display (e.g., display 130-1) of the MR-capable device (block 412). That is, the MR component may activate (or switch to or select) binocular mode in block 412. Continuing with the example scenario in FIG. 5, at step 530, the MR component displays the content in both displays when the user's gaze is focused on the content, which is located at or within the threshold distance $d_2$. In embodiments where the MR-capable device includes a single display (as opposed to two displays), the MR component (at block 412) displays the content on a first display area and a second display area of the single display. Note, when the MR component displays content in one or both displays of the MR-capable device, the MR component may display or render the content using a variety of different visual effects, including for example, fading in the content, sliding in the content, popping in the content, and so on.

After blocks 410 and 412, the method 400 proceeds to block 414, where the MR component determines whether to keep displaying the content on the first display and/or second display of the MR-capable device. For example, in some cases, the MR component may receive an indication from the user (e.g., via the input controls 222) to remove the content from the display(s) of the MR-capable device. In some cases, the MR component may determine to remove the content after a predetermined amount of time has elapsed since the content was presented on the display(s) of the MR-capable device. In some cases, the MR component may determine to remove the content based on MR functionality supported by the application(s).

If the MR component does not determine to remove the content, then the MR component continues to evaluate the convergence point of the user's gaze (e.g., at block 406). In this manner, the MR component may switch between displaying the content on a single display (monocular mode) to displaying the content on both displays (binocular mode), or vice versa, based on the current convergence point of the user's gaze of the user. As shown in FIG. 5, for example, assuming step 530 is a subsequent point in time after step 520, the MR component can switch from monocular to binocular, once the user focuses on the content, which is located within the threshold distance $d_2$ from the user.

If the MR component determines to remove the content (block 414), then the MR component stops displaying the content on one or both displays of the MR-capable device (block 416). When the MR component stops displaying content on one or both displays of the MR-capable device, the MR component may use a variety of different visual effects, including for example, fading out the content, sliding out the content, popping out the content, and so on. After block 416, assuming the MR-capable device is still active, the method 400 then proceeds to block 402. Otherwise, the method 400 exits.

Figure 6A:
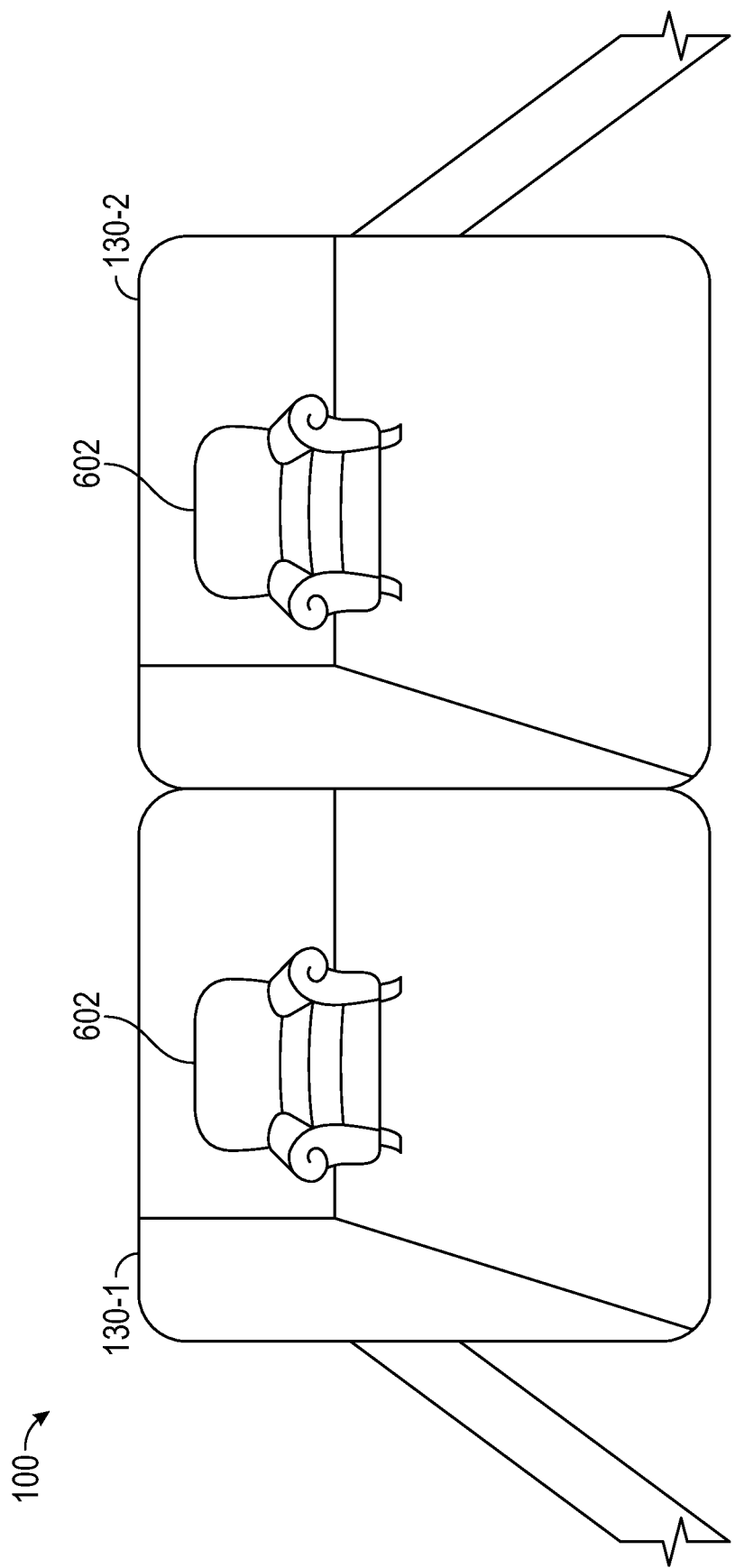
Figure 6C:
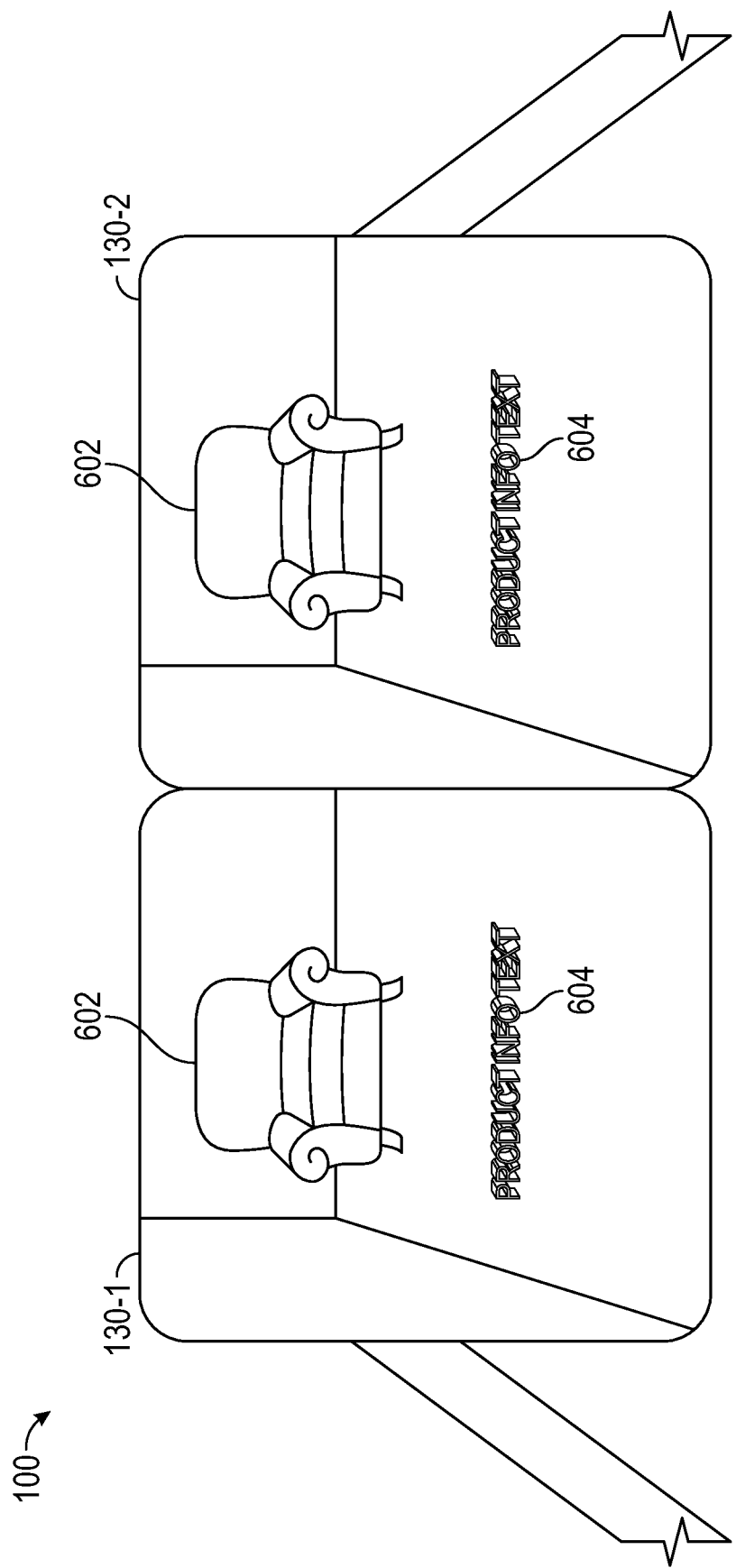

FIGS. 6A-6C illustrate an example scenario of visualizing content in a physical environment using a MR-capable device (e.g., MR-capable device 110), according to one embodiment. Note that while FIGS. 6A-6C illustrate the MR-capable device as having two displays 130-1 and 130-2, in other embodiments, the MR-capable device may have a single display, with a first display area positioned for viewing by a first eye of the user and a second display area positioned for viewing by a second eye of the user.

In some embodiments, the application (e.g., application 230) may enable the user (e.g., user 102) to browse inventory of items for sale on the application and select to preview a particular item (e.g., chair) within the physical environment 100 prior to purchasing the item. In this embodiment, after selecting the item, the MR component (e.g., MR component 232) renders an object 602 (e.g., a virtual object corresponding to the selected item) on displays 130-1 and 130-2 of the MR-capable device, e.g., as shown in FIG. 6A. In another embodiment, the object 602 may be a physical object in the physical environment that is visible to the user through the displays 130-1 and 130-2 of the MR-capable device, e.g., as shown in FIG. 6A.

At a subsequent point in time, the MR-capable device may determine to render content associated with the object 602 on one or both displays 130 of the MR-capable device. The MR-capable device may determine whether to render the content on a single display (using monocular mode) or both displays (using binocular mode), based on the convergence distance of the user's gaze. As shown in FIG. 6B, in response to determining that the convergence distance of the user's gaze is greater than a threshold distance (e.g., the user may be focused on the object 602 located beyond the threshold distance), the MR-capable device displays content 604 on the display 130-2 of the MR-capable device. As shown in FIG. 6B, because the content 604 is displayed on a single display, the content 604 has a two-dimensional (2D) appearance (or, in general, has a lower quality appearance than when the content is displayed on both displays).

At a subsequent point in time, the MR-capable device may determine that the convergence distance of the user's gaze is less than or equal to the threshold distance from the user. For example, the focus of the user's gaze may have changed from the object 602 to the content 604 on the display 130-2. As shown in FIG. 6C, in response to determining that the convergence distance of the user's is less than or equal to the threshold distance, the MR-capable device displays the content 604 on both displays 130-1 and 130-2 of the MR-capable device. For example, the MR-capable device can display the content 604 on the display 130-1, while displaying the content in the display 130-2. As shown in FIG. 6C, because the content 604 is displayed on both displays, the content 604 has a 3D appearance (or, in general, has a higher quality appearance than when the content is displayed on a single display).

Advantageously, embodiments described herein can significantly improve visualization of MR objects on a MR-capable device, e.g., by reducing parallax effects associated with visualizing content using a binocular MR-capable device. This, in turn, can enhance user experience with MR-capable devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

The foregoing may be better understood in view of the following clauses:

Clause 1 is a binocular MR device, comprising:
one or more displays comprising a first display area and a second display area;
a gaze component configured to track a gaze of a user of the binocular MR device within a field of view of the one or more displays to determine a convergence distance of the gaze of the user;
at least one processor; and
a memory storing instructions, which, when executed on the at least one processor perform an operation comprising:
    displaying a first object on the first display area and the second display area;
    determining to display a second object within the field of view at a predetermined distance from the user;
    upon determining, based on the gaze component, that the convergence distance exceeds the predetermined distance, displaying the second object on only one of the first display area and the second display area; and
    upon determining, based on the gaze component, that the convergence distance is less than or equal to the predetermined distance, displaying the second object on both of the first display area and the second display area.

Clause 2 is the binocular MR device of clause 1, wherein determining to display the second object comprises receiving an instruction to display the second object.

Clause 3 is the binocular MR device of any of clauses 1-2, wherein the instruction is based on an input from the user.

Clause 4 is the binocular MR device of any of clauses 1-3, wherein:
the one or more displays comprises a single display;
the first display area is an area of the single display positioned for viewing by a first eye of the user; and
the second display area is an area of the single display positioned for viewing by a second eye of the user.

Clause 5 is the binocular MR device of any of clauses 1-3, wherein:
the one or more displays comprise a first display and a second display;
the first display area is an area of the first display positioned for viewing by a first eye of the user; and
the second display area is an area of the second display positioned for viewing by a second eye of the user.

Clause 6 is the binocular MR device of any of clauses 1-5, wherein:
the first object comprises a three-dimensional (3D) model of a product-for-sale; and the second object comprises text content describing information associated with the product-for-sale.

Clause 7 is a computer-implemented method comprising:
monitoring a gaze of a user of a mixed reality (MR) device through one or more displays of the MR device;
determining a convergence distance of the gaze of the user, based on the monitoring;
selecting between a first projection mode and a second projection mode to display content on the one or more displays, based on whether the convergence distance exceeds a threshold distance from the user; and
displaying the content on the one or more displays, based on the selection.

Clause 8 is the computer-implemented method of clause 7, wherein the first projection mode is selected when the convergence distance exceeds the threshold distance.

Clause 9 is the computer-implemented method of any of clauses 7-8, wherein:
the one or more displays comprises a first display and a second display; and
the content is displayed on only the first display using the first projection mode.

Clause 10 is the computer-implemented method of any of clauses 7-8, wherein:
the one or more displays comprises a single display comprising a first display area and a second display area; and
the content is displayed on only the first display area using the first projection mode.

Clause 11 is the computer-implemented method of any of clauses 7-10, wherein the first projection mode is a monocular projection mode.

Clause 12 is the computer-implemented method of any of clauses 7-11, wherein the second projection mode is selected when the convergence distance does not exceed the threshold distance.

Clause 13 is the computer-implemented method of any of clauses 7-9 and 11-12, wherein:
the one or more displays comprises a first display and a second display; and
the content is displayed on the first display and the second display using the second projection mode.

Clause 14 is the computer-implemented method of any of clauses 7-8 and 10-12, wherein:
the one or more displays comprises a single display comprising a first display area and a second display area; and
the content is displayed on the first display area and the second display area using the second projection mode.

Clause 15 is the computer-implemented method of any of clauses 7-14, wherein the second projection mode is a binocular projection mode.

Clause 16 is the computer-implemented method of any of clauses 7-15, wherein the content is associated with a physical object in a physical environment that is visible through the one or more displays of the MR device.

Clause 17 is the computer-implemented method of any of clauses 7-16, wherein the content is associated with a virtual object displayed on the one or more displays of the MR device.

Clause 18 is a non-transitory computer-readable storage medium having computer-readable program code embodied therewith, the computer-readable program code executable by one or more computer processors to perform an operation comprising:
monitoring a gaze of a user of a mixed reality (MR) device through one or more displays of the MR device;
determining a convergence distance of the gaze of the user, based on the monitoring;
selecting between a first projection mode and a second projection mode to display content on the one or more displays, based on whether the convergence distance exceeds a threshold distance from the user; and displaying the content on the one or more displays, based on the selection.

Clause 19 is the non-transitory computer-readable storage medium of clause 18, wherein the first projection mode is selected when the convergence distance exceeds the threshold distance.

Clause 20 is the non-transitory computer-readable storage medium of any of clauses 18-29, wherein the second projection mode is selected when the convergence distance does not exceed the threshold distance.

What is claimed is:

1. A binocular mixed reality (MR) device, comprising:
one or more displays comprising a first display area and a second display area;
a gaze component configured to track a gaze of a user of the binocular MR device within a field of view of the one or more displays to determine a convergence distance of the gaze of the user;
at least one processor; and
a memory storing instructions, which, when executed on the at least one processor perform an operation comprising:
displaying a first object on the first display area and the second display area;
determining to display a second object within the field of view at a predetermined distance from the user;
upon determining, based on the gaze component, that the convergence distance exceeds the predetermined distance, displaying the second object on only one of the first display area and the second display area; and
upon determining, based on the gaze component, that the convergence distance is less than or equal to the predetermined distance, displaying the second object on both of the first display area and the second display area.

2. The binocular MR device of claim 1, wherein determining to display the second object comprises receiving an instruction to display the second object.

3. The binocular MR device of claim 2, wherein the instruction is based on an input from the user.

4. The binocular MR device of claim 1, wherein:
the one or more displays comprises a single display;
the first display area is an area of the single display positioned for viewing by a first eye of the user; and
the second display area is an area of the single display positioned for viewing by a second eye of the user.

5. The binocular MR device of claim 1, wherein:
the one or more displays comprise a first display and a second display;
the first display area is an area of the first display positioned for viewing by a first eye of the user; and
the second display area is an area of the second display positioned for viewing by a second eye of the user.

6. The binocular MR device of claim 1, wherein:
the first object comprises a three-dimensional (3D) model of a product-for-sale; and
the second object comprises text content describing information associated with the product-for-sale.

7. A computer-implemented method comprising:
monitoring a gaze of a user of a mixed reality (MR) device through one or more displays of the MR device;
determining a convergence distance of the gaze of the user, based on the monitoring;

selecting between a first projection mode and a second projection mode to display content on the one or more displays, based on whether the convergence distance exceeds a threshold distance from the user; and displaying the content on the one or more displays, based on the selection.

8. The computer-implemented method of claim 7, wherein the first projection mode is selected when the convergence distance exceeds the threshold distance.

9. The computer-implemented method of claim 8, wherein:
the one or more displays comprises a first display and a second display; and
the content is displayed on only the first display using the first projection mode.

10. The computer-implemented method of claim 8, wherein:
the one or more displays comprises a single display comprising a first display area and a second display area; and
the content is displayed on only the first display area using the first projection mode.

11. The computer-implemented method of claim 8, wherein the first projection mode is a monocular projection mode.

12. The computer-implemented method of claim 7, wherein the second projection mode is selected when the convergence distance does not exceed the threshold distance.

13. The computer-implemented method of claim 12, wherein:
the one or more displays comprises a first display and a second display; and
the content is displayed on the first display and the second display using the second projection mode.

14. The computer-implemented method of claim 12, wherein:
the one or more displays comprises a single display comprising a first display area and a second display area; and
the content is displayed on the first display area and the second display area using the second projection mode.

15. The computer-implemented method of claim 14, wherein the second projection mode is a binocular projection mode.

16. The computer-implemented method of claim 7, wherein the content is associated with a physical object in a physical environment that is visible through the one or more displays of the MR device.

17. The computer-implemented method of claim 7, wherein the content is associated with a virtual object displayed on the one or more displays of the MR device.

18. A non-transitory computer-readable storage medium having computer-readable program code embodied therewith, the computer-readable program code executable by one or more computer processors to perform an operation comprising:
monitoring a gaze of a user of a mixed reality (MR) device through one or more displays of the MR device;
determining a convergence distance of the gaze of the user, based on the monitoring;
selecting between a first projection mode and a second projection mode to display content on the one or more displays, based on whether the convergence distance exceeds a threshold distance from the user; and
displaying the content on the one or more displays, based on the selection.

19. The non-transitory computer-readable storage medium of claim 18, wherein the first projection mode is selected when the convergence distance exceeds the threshold distance.

20. The non-transitory computer-readable storage medium of claim 18, wherein the second projection mode is selected when the convergence distance does not exceed the threshold distance.

* * * * *